(12) United States Patent  
Ojanen

(10) Patent No.: US 7,405,816 B2
(45) Date of Patent: Jul. 29, 2008

(54) SCALABLE TEST TARGET AND METHOD FOR MEASUREMENT OF CAMERA IMAGE QUALITY

(75) Inventor: Harri J. Ojanen, Helsinki (FI)

(73) Assignee: Nokia Corporation, Espoo (FI)

( * ) Notice: Subject to any disclaimer, the term of this patent is extended or adjusted under 35 U.S.C. 154(b) by 331 days.

(21) Appl. No.: 11/243,209

(22) Filed: Oct. 4, 2005

(65) Prior Publication Data

US 2007/0076981 A1 Apr. 5, 2007

(51) Int. Cl.
*G01B 9/00* (2006.01)
*H04N 17/00* (2006.01)

(52) U.S. Cl. .................... 356/124; 348/187; 348/188

(58) Field of Classification Search ......... 356/121–127; 382/255, 286; 348/187, 188, 207.99, 251, 348/175–176
See application file for complete search history.

(56) References Cited

U.S. PATENT DOCUMENTS

| | | | | |
|---|---|---|---|---|
| 5,659,813 A | * | 8/1997 | Kusaka et al. ............... | 396/111 |
| 5,883,982 A | * | 3/1999 | Riley et al. .................. | 382/255 |
| 5,959,726 A | * | 9/1999 | Riley et al. ............... | 356/124.5 |
| 6,437,823 B1 | * | 8/2002 | Zhang ......................... | 348/187 |
| 7,023,472 B1 | * | 4/2006 | Kang et al. .................. | 348/187 |
| 7,151,560 B2 | * | 12/2006 | Matherson et al. .......... | 348/187 |
| 2005/0030383 A1 | * | 2/2005 | Li ............................ | 348/207.1 |
| 2006/0001861 A1 | * | 1/2006 | Wegmann .................... | 356/124 |

OTHER PUBLICATIONS

Automatic Grid Finding in Calibration Patterns using Delaunay Triangulation, Shu et al., National Research Council of Canada, Aug. 2003, 18 pages.

* cited by examiner

*Primary Examiner*—Hoa Q Pham
(74) *Attorney, Agent, or Firm*—Foley & Lardner LLP

(57) ABSTRACT

An improved test target pattern that can be used in the testing of image quality for digital images taken with a camera module, the camera module either being a stand-alone product or being incorporated into a device such as a mobile telephone. With the present invention, several different image quality aspects can be monitored and measured using a single test pattern. Previously, multiple test patterns would have had to have been used for such a task.

13 Claims, 5 Drawing Sheets

SCALABLE TEST TARGET AND METHOD FOR MEASUREMENT OF CAMERA IMAGE QUALITY

FIELD OF THE INVENTION

The present invention relates generally to the performance of digital cameras. More particularly, the present invention relates to the measurement of image quality in digital camera performance.

BACKGROUND OF THE INVENTION

In recent years, the popularity of "camera phones" has increased exponentially. A larger and larger percentage of mobile telephones are being built with a camera module, which enables users to quickly and easily take digital photographs and transmit them to other devices and users.

In one typical camera phone, the phone includes a camera module 110 depicted in FIG. 1. The camera module 110 can be a stand-alone device or can be incorporated into another electronic device, such as a portable telephone. The camera module 110 includes a housing 111 which contains at least one lens 112, a primary memory unit 114, a camera processor 116, and at least one image sensor 118. The primary memory unit 114 can be used to store digital images and computer software for performing various functions in the camera module 110, as well as to implement the present invention. A removable, secondary memory unit 120 in the form of a memory card can also be included in the digital camera to provide extra memory space. The at least one image sensor 118 can be a charge coupled device (CCD), a complementary metal oxide semiconductor (CMOS), or another system. The camera module 110 may also include at least one motion sensor 130 operatively connected to the camera processor 116. When a picture of an object 128 is taken, the at least one lens 112 focuses the image onto the at least one image sensor 118 which records light electronically. The camera processor 116 then breaks this electronic information down into digital data which can be stored on the primary memory unit 114 and/or the secondary memory unit 120.

As camera-telephone combinations have become more common, users' expectations of the quality of pictures taken with the devices have also risen. Users are often no longer satisfied with digital images of a quality which was considered acceptable only a few years ago. As a result of these increased expectations, manufacturers must pay more attention to the quality of the images that are produced by their camera-phones.

There are several technical parameters that are used to describe different aspects of image quality in an image. For one, systems often monitor and measure the sharpness of an image produced by a camera. The sharpness may vary in different parts of the image, and the center area of an image is typically sharper than corner areas. Still further, systems monitor the amount of noise that is present in an image. For instance, smoothly colored areas sometimes will not be smooth, instead possessing a certain degree of graininess or noise. Systems also monitor whether the colors in the captured image are correct.

Systems also monitor whether geometric shapes in an image are distorted. Distortion can be defined as the departure of the image geometry formed by a real imaging system from that of ideal perspective projection. Distortion has the effect of shifting image points from their ideal locations, but it does not induce blurring to the image. In general, distortion is position dependent over the image area and has a vectorial character, i.e. image points are shifted both in radial and tangential directions. With distortion, straight lines may become curved in some situations.

It is often important to perform many separate measurements of the various image quality parameters. For example, a set of sample camera modules could each be measured under different operating conditions. In such a situation, it is important to have a measurement setup that yields the parameters of interest quickly and conveniently in order to maintain a low cost for performing the measurements.

Currently, technical image quality parameters are often measured so that there is a different test setup for each parameter. Some measurements are test chart-based, while others use special instruments to perform the measurements. In addition, tests have to be performed under many different conditions, such as under different camera settings, different camera-to-subject distances, and different field of views (i.e., different zoom settings or cameras with different focal lengths). Performing these measurements can become extremely expensive if several different test setups are required. Typically, even with chart-based measurements, if the field of view is changed, test charts of different sizes are required.

There are several standards that describe how a single technical parameter can be measured. Some examples include the ISO 12233: MTF measurement standard (also referred to as the spatial frequency response); the ISO 9039: Optics and optical instruments standard, which pertains to a quality evaluation of optical systems and the determination of distortion; and the ISO 15739: Photography standard, which relates to electronic still-picture imaging and noise measurements. Another system uses a rectangular checker board pattern to calibrate the cameras and/or camera modules. Such a system is described in Shu, C., Brunton, A., Fiala, M., "Automatic Grid Finding In Calibration Patterns Using Delaunay Triangulation," National Research Council of Canada report NRC-46497/ERB-1104, 2003.

SUMMARY OF THE INVENTION

The present invention provides for a test chart and analysis method that combines many different technical image quality parameters into a single in a scalable manner. With the present invention, the same chart can be used across a wide range of different field of views and camera-to-chart distances. Such a system is particularly useful in testing zoom and autofocus (AF) cameras, while also being useful in testing the performance of fixed-focus cameras at different distances.

The test target pattern of the present invention provides a low contrast so that modulation transfer function (MTF) measurements are reliable, even without opto-electronic conversion function (OECF) correction. The test chart's annular structure provides sagittal and tangential MTF's, while also enabling the monitoring and measurement of optical distortion measurement and not only picture height distortion. The overall medium gray used in the test chart also virtually guarantees the correct exposure of the chart, which is not the case with line grids. Lastly, the test chart is also scalable, providing another important benefit.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 4:
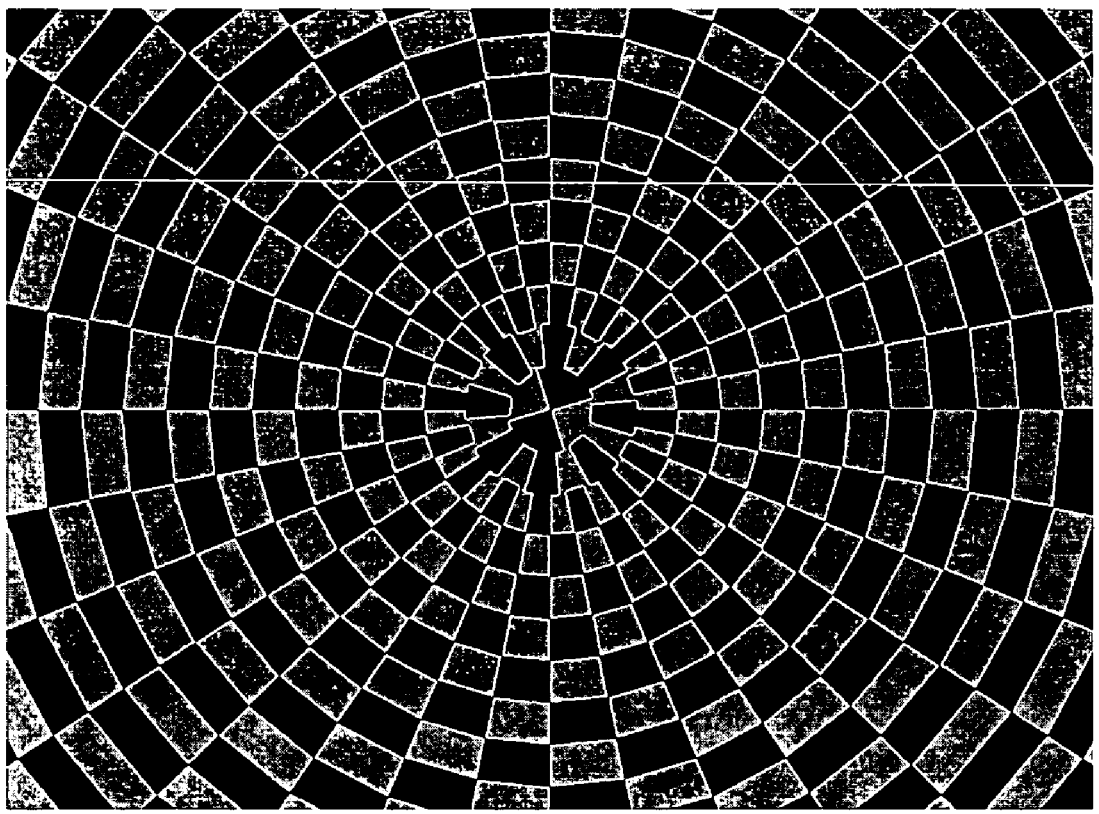
FIG. 4 is a representation of a test pattern of the present invention that can be used for the monitoring and measurement of image quality of an image captured by a digital camera or camera module.

The present invention involves the use of an annular checker board pattern as a test chart for use in monitoring and measuring image quality on a photograph. A test pattern according to a particular embodiment of the present invention is shown in FIG. 4. As shown in FIG. 4, the test pattern includes a plurality of concentric annuli. Most of the rings comprise a plurality of rectangularly-shaped portions which alternate in color. In one embodiment of the invention, the rectangularly-shaped portions alternate between black and white in color. At the center of the test pattern of FIG. 4 is a circle comprising four triangularly-shaped portions. In some of the rings closest to the center of the test pattern, individual portions of the respective rings are more trapezoidal in shape.

In the test pattern of the present invention, the corners of the black and white rectangles can be very accurately detected from the image produced by the camera module that is being tested. This is important, for example in measuring the level of optical distortion. In addition, the annular structure of the test pattern of the present invention is important so that MTF measurements can be taken in both the sagittal and tangential directions across the whole image area. Using the sagittal and tangential directions for MTF measurements is important because, if the measurements were always horizontally and vertically, it could difficult to detect strong astigmatism in the corners of the pattern.

Figure 5:
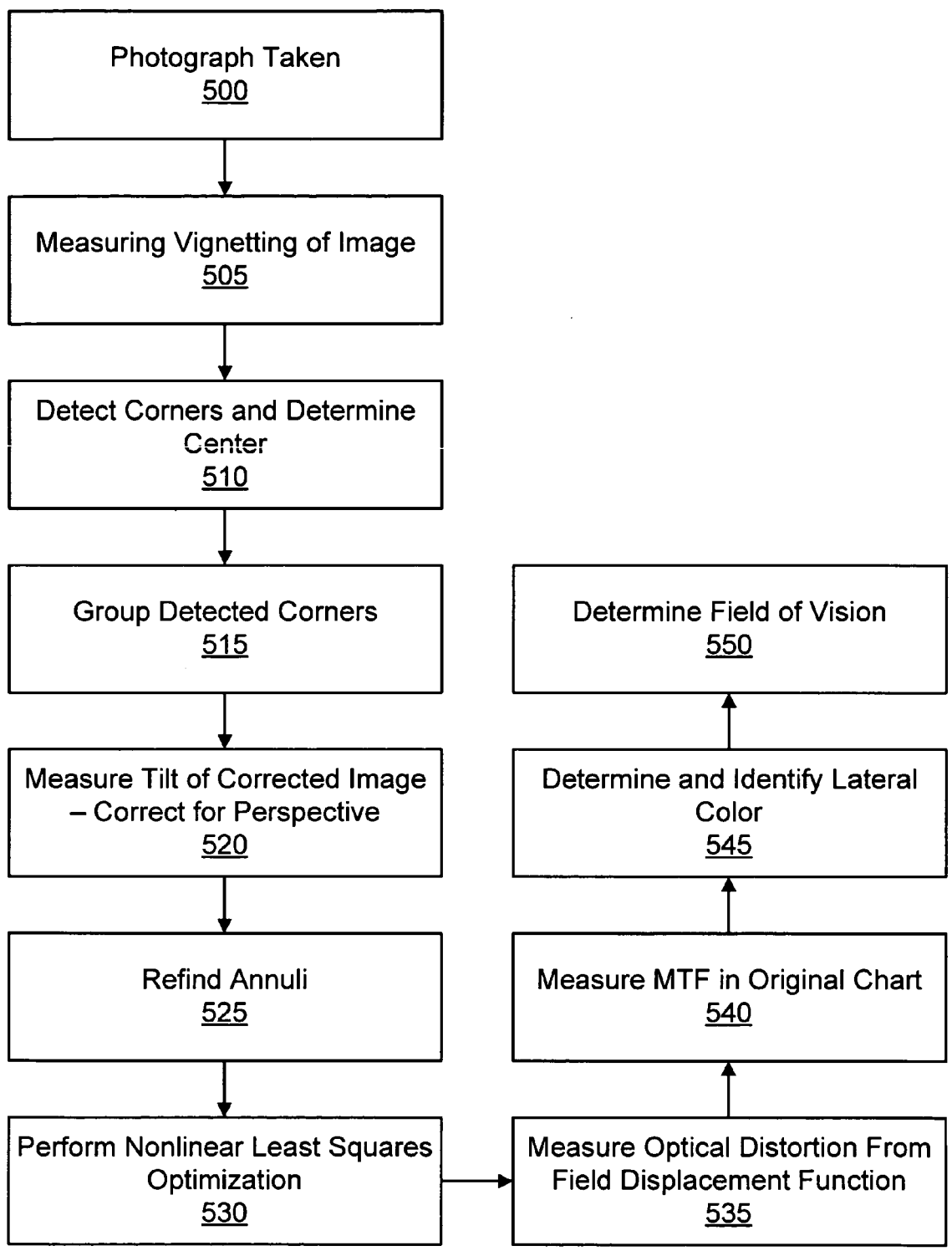
FIG. 5 is a flow chart showing one method of using a test pattern of the present invention to monitor and measure image quality in a captured image.

FIG. 5 is a flow chart showing one method of using a test pattern of the present invention. At step 500 in FIG. 5, the camera module takes a photograph of the test chart of FIG. 4. At step 505, the vignetting of the captured image can be measured as a function of the field, and a vignetting corrected image is generated. At step 510, the corners in the corrected image are detected, and the center of the detected image (x0, y0) is determined. At step 515, the detected corners are grouped based upon their distances from the center of the corrected image. At this step, the annuli are grouped together. At step 520, the tilt of the corrected image is measured, and the corrected image is again corrected for perspective in the corner coordinate set. At step 525, annuli are refound from the perspective corrected corner coordinates, which are needed close to the corners of the image. If there is strong distortion, the tilt may cause otherwise detected corners to end up in the wrong annulus.

At step 530, a nonlinear least squares optimization is performed to find the optical distortion, optical axis location, and tilt by nonlinear minimization. This is accomplished by using the original corner data. This is accomplished using the following initial approximations: the field displacement function is identity, the optical axis location is the chart center, and the tilt is as was found in step 520.

In addition to the above, other features can also be measured. For example, and as represented at step 535, the optical distortion from the field displacement function can be measured. At step 540, MTF can be measured at desired locations in the original chart based upon the locations of the detected corners. This can be accomplished, for example, by using the arbitrary angle SFR algorithm, described in Harri J. Ojanen, Ari Tervonen, "Method for Characterizing a Digital Imaging System", U.S. patent application Ser. No. 10/853,005, filed May 25, 2004. At step 545, the lateral color can be determined and identified by the difference between the field displacement functions for each channel. Lastly, the field of vision (FOV) can be determined based upon the number of visible annuli (when the camera-to-chart distance and chart size is known). This is represented at step 550. It should be understood that, although all of the steps in FIG. 5 are depicted as occurring sequentially, many of the steps can be performed in a variety of orders, as would be understood by those of skill in the art.

The process of perspective mapping is accomplished in accordance with the following formulae. Given a point $x \in R^2$, the perspective correction mapping with a tilt vector $\tau \in R^2$ is defined by $$\pi_\tau(x) = 2(\tilde{x} - K)\frac{(b_0 - K) \cdot n_\tau}{(\tilde{x} - K) \cdot n_\tau} + K,$$

where $$\tilde{x} = (x_1, x_2, 0)$$

$$n_\tau = \frac{(\tau_1, \tau_2, 1)}{|(\tau_1, \tau_2, 1)|}$$

$$K = (0, 0, 2)$$

$$b_0 = (0, 0, 1)$$

The function to minimize in step 530 is $$f(\bar{p}, \bar{r}, x_0, x_c, \tau) = \sum_{k,j} \left( \left| d(\pi_\tau(p_{kj}) - x_0) \frac{\pi_\tau(p_{kj}) - x_0}{|\pi_\tau(p_{kj}) - x_0|} + x_0 - x_c \right| - r_j \right)^2,$$

where $\bar{p} = (p_{kj})$ is the collection of detected corner points, arranged to annuli (for a number j); $\bar{p}=(p_{kj})$ is the collection of detected corner points, arranged to annuli; $\bar{r}=(r_j)$ is the non-distorted radii of the annuli (i.e., with constant increments for the proposed target); $x_0$ is the optical axis coordinates in the image; $x_c$ is the coordinates of the chart center; $\tau$ is the tilt vector; and d is the displacement function of the lens. The function identified above is used to map distorted radial coordinates to ideal non-distorted radii (e.g., a polynomial).

Compared to earlier solutions, the present invention combines many technical image quality parameters into a single chart in a scalable way. With the present invention, the same chart can be used at different distances and at different field of view settings (e.g. with a zoom lens). Therefore, the measurement time for a test system is greatly reduced with the implementation of the present invention.

Figure 1:
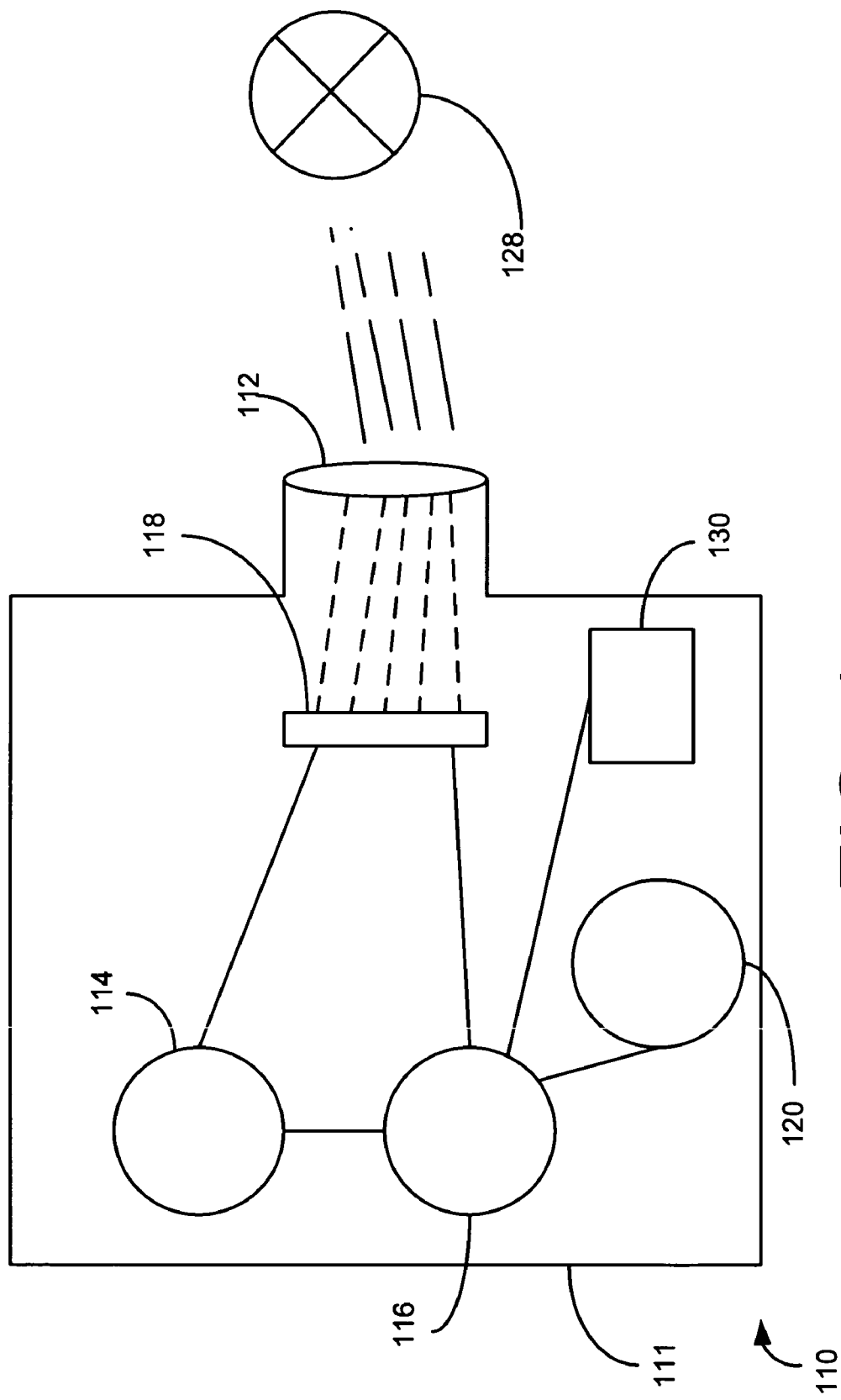
FIG. 1 is a sectional side view of one type of digital camera module that is incorporated into mobile telephones.
Figure 2:
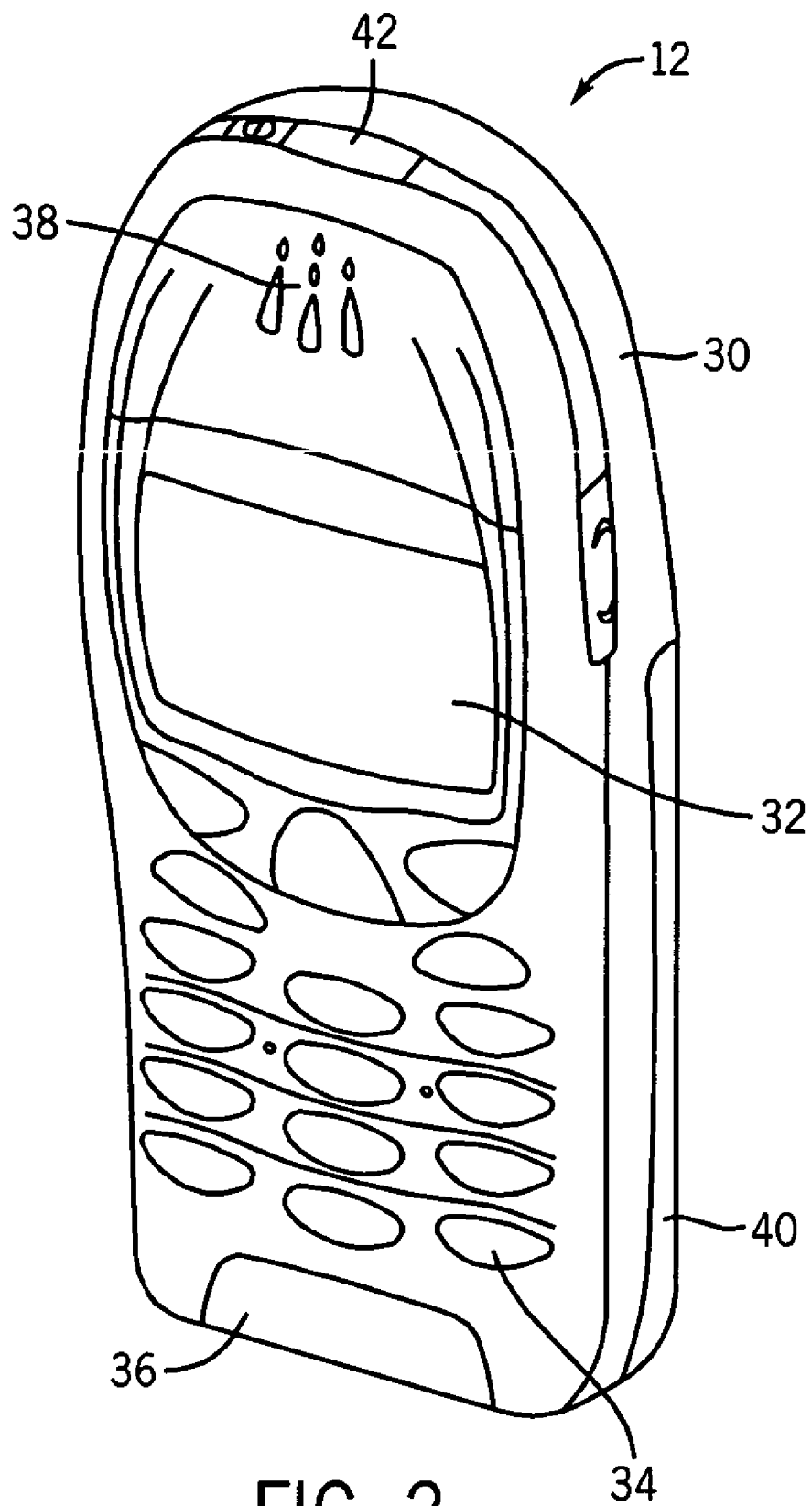
FIG. 2 is a perspective view of a mobile telephone that can be used in the implementation of the present invention.
Figure 3:
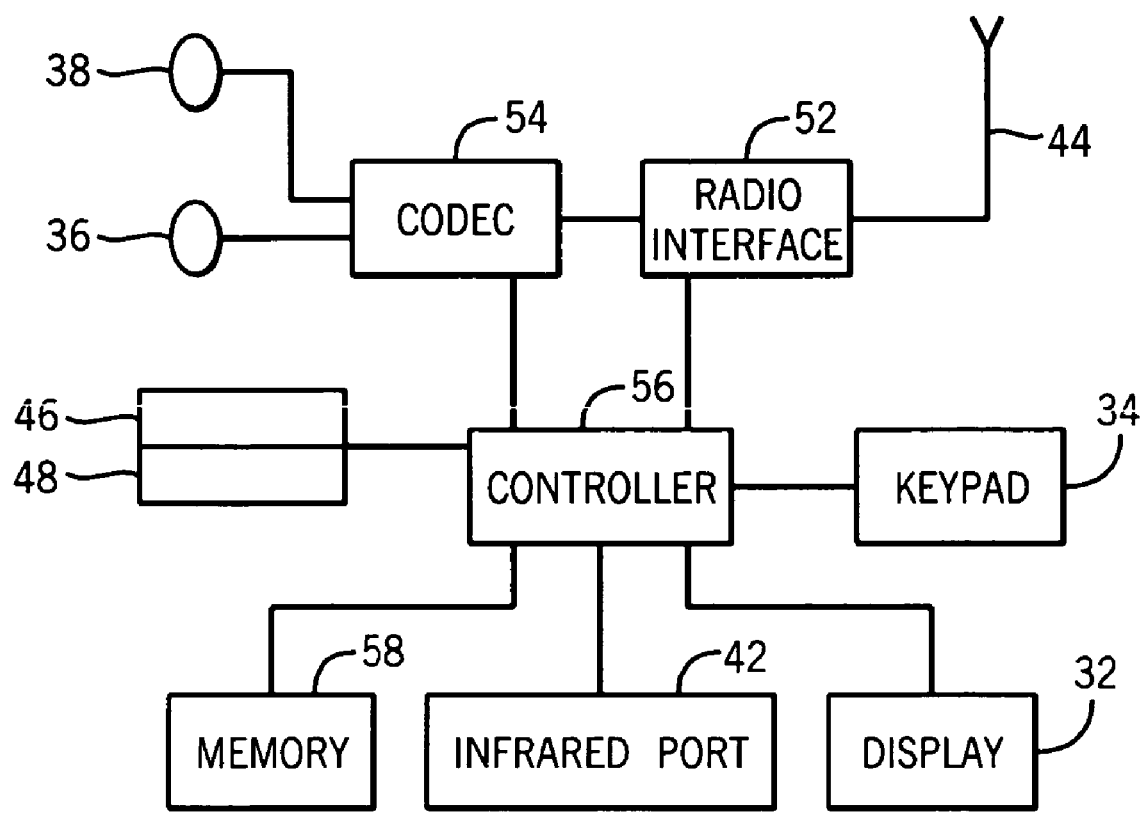
FIG. 3 is a schematic representation of the telephone circuitry of the mobile telephone of FIG. 2.

FIGS. 2 and 3 show one representative mobile telephone 12 upon which the camera module 110 of FIG. 1 may be installed. However, it is important to note that such camera modules 110 could be incorporated into devices such as personal digital assistants, personal computers, and other devices. It should be understood that the present invention could be incorporated on a wide variety of mobile telephones 12. Furthermore, it should also be noted that the method of the present invention can be run on a device such as a mobile telephone 12, or the mobile telephone 12 or other device may be used only for capturing the image, after which the method of the present invention is run on another device such as a personal computer.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller 56 and a memory 58. It should be noted that the controller 56 can be the same unit or a different unit than the camera processor 116. The memory 58 may or may not be the same component as the primary memory unit 114 in various embodiments of the present invention. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of measuring the quality of an image captured by a camera module, the image comprising a plurality of concentric annuli, at least one of the plurality of concentric annuli comprising a plurality of rectangularly-shaped segments of alternating colors, the method comprising:

measuring vignetting of the captured image;

generating a corrected image based upon the measured vignetting;

detecting corners and determining a center of the corrected image, the detected corners and determined center being used to group the annuli of the corrected image;

grouping the detected corners based upon their distances from the determined center;

measuring a tilt of the corrected image and generating a recorrected image based upon the measured tilt; and refinding the annuli in the recorrected image.

2. The method of claim 1, further comprising using the recorrected image to find the optical distortion, optical axis location, and tilt of the image.

3. The method of claim 2, wherein the optical distortion, optical axis location and tilt of the image is found through the use of a nonlinear least squares optimization.

4. The method of claim 1, further comprising measuring the modular transfer function of the image at predetermined locations within the image.

5. The method of claim 1, further comprising measuring a lateral color of the image.

6. The method of claim 1, further comprising determining a field of view for the camera module based upon the number of visible annuli in the image.

7. A computer program product for measuring the quality of an image captured by a camera module, the image comprising a plurality of concentric annuli, at least one of the plurality of concentric annuli comprising a plurality of rectangularly-shaped segments of alternating colors, the computer program product comprising:

computer code for measuring vignetting of the captured image;

computer code for generating a corrected image based upon the measured vignetting;

computer code for detecting corners and determining a center of the corrected image, the detected corners and determined center being used to group the annuli of the corrected image;

computer code for grouping the detected corners based upon their distances from the determined center;

computer code for measuring a tilt of the corrected image and generating a recorrected image based upon the measured tilt; and computer code for refunding the annuli in the recorrected image.

8. The computer program product of claim 7, further comprising computer code for using the recorrected image to find the optical distortion, optical axis location, and tilt of the image.

9. The computer program product of claim 8, wherein the optical distortion, optical axis location and tilt of the image is found through the use of a nonlinear least squares optimization.

10. The computer program product of claim 7, further comprising computer code for measuring the modulation transfer function of the image at predetermined locations within the image.

11. The computer program product of claim 7, further comprising computer code for measuring a lateral color of the image.

12. The computer program product of claim 7, further comprising computer code for determining a field of view for the camera module based upon the number of visible annuli in the image.

13. An electronic device, comprising:
a processor; and
a memory unit operatively connected to the processor and including a computer program product for measuring the quality of an image captured by a camera module, the image comprising a plurality of concentric annuli, at least one of the plurality of concentric annuli comprising a plurality of rectangularly-shaped segments of alternating colors, the computer program product comprising:
computer code for measuring vignetting of the captured image;
computer code for generating a corrected image based upon the measured vignetting;
computer code for detecting corners and determining a center of the corrected image, the detected corners and determined center being used to group the annuli of the corrected image;
computer code for grouping the detected corners based upon their distances from the determined center;
computer code for measuring a tilt of the corrected image and generating a recorrected image based upon the measured tilt; and
computer code for refinding the annuli in the recorrected image.

* * * * *